US006477596B2

United States Patent
Miura et al.

(10) Patent No.: US 6,477,596 B2
(45) Date of Patent: Nov. 5, 2002

(54) BUS CONTROLLING METHOD AND APPARATUS FOR DELAYING ACTIVATION OF A BUS CYCLE

(75) Inventors: Hiroki Miura, Warabi; Yasuhito Koumura, Tokyo; Kenshi Matsumoto, Koshigaya, all of (JP)

(73) Assignee: Sanyo Electric Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/931,292

(22) Filed: Sep. 16, 1997

(65) Prior Publication Data

US 2001/0049759 A1 Dec. 6, 2001

(30) Foreign Application Priority Data

Sep. 20, 1996 (JP) .............................................. 8-250269

(51) Int. Cl.$^7$ .............................................. G06F 13/00
(52) U.S. Cl. ........................ 710/107; 710/113; 710/129; 710/125; 713/400; 713/401; 713/500; 713/501; 713/600
(58) Field of Search ................................ 395/293, 309; 710/129, 107–125; 713/600, 400, 401, 500, 501

(56) References Cited

U.S. PATENT DOCUMENTS

| 4,851,990 A | * | 7/1989 | Johnson et al. ............. 364/200 |
| 4,901,226 A | * | 2/1990 | Barlow ........................ 710/122 |
| 5,278,974 A | * | 1/1994 | Lemmon et al. ............ 713/600 |
| 5,444,857 A | * | 8/1995 | Rowland ..................... 395/309 |
| 5,469,561 A | * | 11/1995 | Takeda ........................ 713/600 |
| 5,797,018 A | * | 8/1998 | Tavallaei et al. ............ 710/200 |
| 6,020,931 A | * | 2/2000 | Bilbrey et al. .............. 348/584 |

FOREIGN PATENT DOCUMENTS

| CN | 193755 | 5/1992 |
| EP | 0 687 984 | 12/1995 |

* cited by examiner

Primary Examiner—David Wiley
Assistant Examiner—Frantz B. Jean
(74) Attorney, Agent, or Firm—Hogan & Hartson LLP

(57) ABSTRACT

With respect to design regarding a bus cycle, it has been necessary to consider a data conflict, if an output disable time of a device is long. A bus controlling unit is installed in a processor. In the bus controlling unit, parameters regarding output disable times of external devices such as a first device are utilized. When a device with a long output disable time is read in a bus cycle, an idle state is forcibly inserted before a following bus cycle activation to avoid a data conflict.

7 Claims, 4 Drawing Sheets

BUS CONTROLLING METHOD AND APPARATUS FOR DELAYING ACTIVATION OF A BUS CYCLE

BACKGROUND OF THE INVENTION

1. Field of the Invention

The present invention relates to a bus controlling method and equipment. More particularly, in a case where a plurality of devices are accessed through a common bus, the present invention relates to a method for controlling a bus cycle for each device and to equipment using the method.

2. Description of the Related Arts

A variety of data processing equipment such as PCs usually have microprocessors which centrally control the entire equipment. A microprocessor is connected to a variety of memories and I/O devices through buses such as a local bus and a system bus. In recent microprocessors, a cache memory and a circuit regarding a communication function are often installed. However, for memories other than a cache memory or I/O devices, microprocessors access them by performing an ordinary bus cycle.

FIG. 4 is a timing chart of a bus cycle described on page 125 of "Hitachi single chip RISC microcomputers SH7032, SH7034, HD6417032, HD6477034, and HD6437034 hardware manuals (third edition)". In this figure, CK denotes an operation clock of the microcomputer, and A21~0 are addresses for addressing external devices. *CSn represents a chip select asserted when an nth space (hereafter simply called address space n) of address spaces partitioned into a plurality of spaces is accessed, and *RD is a read command which is active on a low signal level. AD15~0 unit data. Hereafter, a signal prefixed with * unit the signal which is active on a low signal level.

In FIG. 4, one period of the clock CK is equivalent to each state T1, or T2. If the configuration is as simple as possible, each device is assigned to each address space n on a one to one basis, and the address space n becomes an exclusive space for the device. Therefore, each device has a connection with one chip select *CS.

One of the characteristics of the microcomputer in FIG. 4 is that it can change an assertion timing of a read command *RD. As shown in the figure, if RDDTY=0, the assertion timing is set to be slightly later, while it is set to be slightly earlier if RDDTY=1. The signal RDDTY can respectively be set for each address space n. According to the manual description, an access time to an external device can be set long by setting RDDTY=1.

For the microcomputer described above, the assertion timing of the read command can respectively be set for each device to be accessed. This is a technique which takes an access time to a device into consideration.

On the other hand, when timings regarding a bus cycle are designed, an output disable time of a device should be considered in some cases. An output disable time is the time from negation timing of a read command to the device to a timing when a data buffer of the device actually becomes OFF so that an output from that device completely floats. If this output disable time is long and the next bus cycle is a write cycle, for example, a conflict occurs on the bus between the output from the device and a write data. This leads to an increased power consumption and a lower long term reliability of the device. Even when the next bus cycle is a read cycle, outputs from two devices may conflict. The possibility of data conflict will be lowered if a read command is negated earlier. However, for an ordinary IC, the lowermost output disable time is set to fall within 0~several ns in the standard. Therefore, it is possible for read data to float before the data is taken in. It is generally risky to design a read command to be negated early. Therefore, design with consideration of the output disable time can be very troublesome in some cases.

In the case of the microcomputer shown in FIG. 4, an inactive time of a read command can be extended by making RDDTY =0. For this reason, if the read cycle is repeated, output timing of read data from a device shifts later, and the possibility of data conflict between the data and read data from a device previously selected is lowered. However, if a write cycle comes after a read cycle, a data conflict can not be avoided.

SUMMARY OF THE INVENTION

The present invention is created from consideration of the problem described above. The object of the present invention is to provide a bus controlling method and equipment for a plurality of devices with different output disable times, which prevents data conflicts from occurring while avoiding performance degradation. Another object of the present invention is to automatically perform such control using pre-set parameters or the like. Still another object of the present invention is to provide a bus controlling method and equipment which enables easier design of external circuits.

1. Regarding a Bus Controlling Method

A principle to solve the problem described above is, for controlling a bus cycle $BC_i$, to refer to the immediately preceding bus cycle $BC_{i-1}$. In other words, based on a characteristic of a device accessed in $BC_{i-1}$, for example, an output disable time thereof, activation of $BC_i$ is delayed if necessary after the end of $BC_{i-1}$. Here, "devices" unit general targets to be accessed.

The problem of the prior art can be solved with the present invention, since a bus cycle control is performed in response to the immediately preceding bus cycle. One method to delay a bus cycle activation is to insert an idle state.

In one aspect of the present invention, a characteristic of a device to be accessed in $BC_{i-1}$ is specified by referring to:

a. an address being output when each device is allocated in an exclusive address space, and b. the number of wait cycles in the current bus cycle or the like.

According to the present invention, activation of $BC_i$ is delayed only when it is necessary. Therefore, a data conflict can be avoided without leading to unnecessary degradation of processing performance. When the output disable time is considered as a characteristic of a device, the device with a long output disable time is often a low speed device. Therefore, when the present invention is implemented, a low speed device may be specified. This method has high practicality, although it is simple.

In another aspect of the present invention, if the device having output data in $BC_{i-1}$ is also the device to output data in $BC_i$, $BC_i$ is activated without delay. This is because no conflict occurs when data are output from the same single device. Device here is meant to include a microprocessor and the like. Therefore, according to this aspect, when a microprocessor carries out a writing operation continuously to a device, BCi will not be delayed unnecessarily.

2. Regarding Bus Controlling Equipment

The present invention comprises setting unit for setting a parameter related to an output disable time of a device to be accessed, and bus controlling unit for inserting an idle state after a current bus cycle in response to an output disable time of a device being accessed in the current bus cycle, based on the parameter set by the setting unit. The "parameter related to the output disable time" is meant to include all parameters to judge or estimate not only the output disable time itself but also whether the output disable time is long or short.

With this configuration, the effect same as 1 described above can be realized for equipment. A work load for designing a circuit outside the equipment is also reduced, since this equipment considers output disable times by itself.

One aspect of the present invention comprises judging unit for judging whether or not a device to output data in a current bus cycle is also a device to output data in the following bus cycle, and prohibition unit for prohibiting insertion of the idle state after the current bus cycle if the devices are judged to be the same. As described in 1 above, no data conflict occurs when one and the same device continuously outputs data. Unnecessary delays will be avoided by taking such cases into consideration.

DESCRIPTION OF THE PREFERRED EMBODIMENT

Hereafter, a preferred embodiment of the present invention will be explained referring to accompanying drawings.

[1] Configuration

Figure 1:
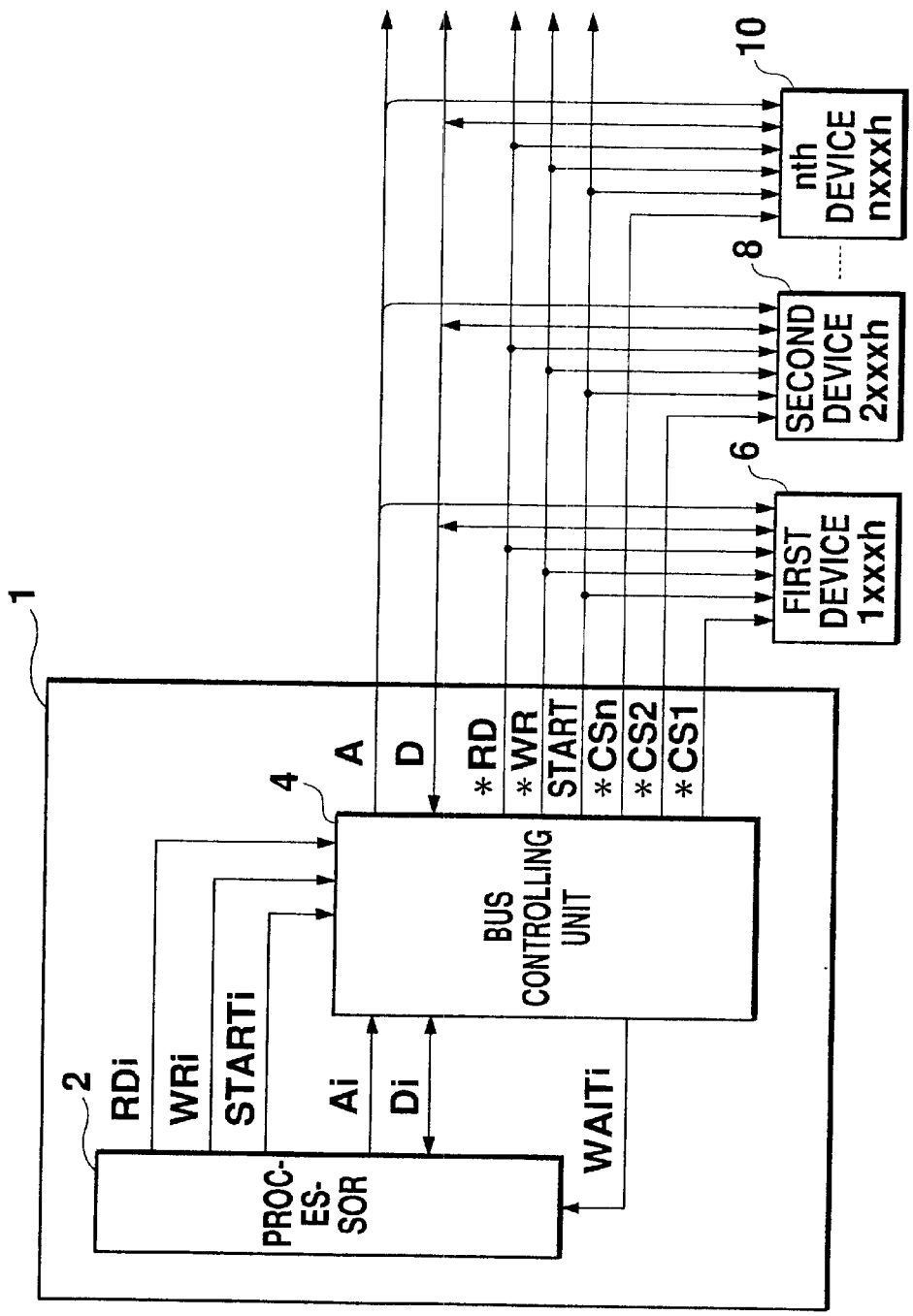
FIG. 1 is a circuit configuration diagram of a microcomputer using a bus controlling equipment related to an embodiment of the present invention.

FIG. 1 is a circuit configuration diagram of a microcomputer using a bus controlling device related to an embodiment of the present invention. In this figure, a processor 2 constitutes the core logic of a microcomputer 1 and controls the entire microcomputer. The processor 2 has an address Ai and data Di. Moreover, the processor 2 outputs a read command RDi, a write command WRi and STARTi which shows a start timing of a bus cycle, all of which are active when the signal level is high, and temporarily supplies these signals to a bus controlling unit 4. The bus controlling unit 4 refers to the address A by itself, and outputs the address as it is to an external device. As for the data Di, the bus controlling unit 4 serves as a data transceiver and connects to data D which is an external data bus. Signals with suffix "i" added to their names mean internal signals of the microcomputer 1.

Based on the address A, the bus controlling unit 4 generates chip select signals *CS1, *CS2, through *CSn for a first device 6, a second device 8, through an nth device 10, all of which are external devices. Here, an exclusive address space is meant to be allocated for each device such as the first device 6: 1000h~1FFFh
the second device 8: 2000h~2FFFh
the nth device 10: n000h~nFFFh.

Therefore, if the address A shows "1234h" for example, it can be specified as an access to the first device 6.

When the bus controlling unit 4 judges that an output disable time of the device being accessed in the current bus cycle $BC_i$ is long, it inserts an idle state between the bus cycle $BC_i$ and the following bus cycle $BC_{i+1}$. In the present embodiment, the processor 2 is not involved in generation of such idle states. If a bus cycle is being executed within the processor 2, the processor 2 will activate the following bus cycle at the earliest timing. On the other hand, the bus controlling unit 4 delays activation of a bus cycle for the external devices when an idle state should be inserted. Therefore, a bus cycle may be being executed within the processor 2, although the processor 2 appears to be in an idle state when viewed from outside the processor 2.

The bus controlling unit 4 latches a read command RDi, a write command WRi, and a cycle start signal STARTi, all of which are supplied from the processor 2. The bus controlling unit 4 then respectively asserts the latched signals as signals for the external devices *RD, *WR, and START, immediately after the idle state is finished. During this process, a wait signal WAITi is asserted by the processor 2 in order to suspend the processor 2.

The first, second, and nth devices 6, 8, and 10 are connected to the address A, a bus for the data D, *RD, *WR, START, and corresponding chip selects *CS1, *CS2, and *CSn. For the first device 6 for example, if *CS1 and *RD are asserted together, data corresponding to the address A at this time is read out. When *CS1 and *WR are asserted together, a write data from the processor 2 is written on a device specified by the address A. The START signal may not necessarily be referred to, depending on a device to be accessed.

Figure 2:
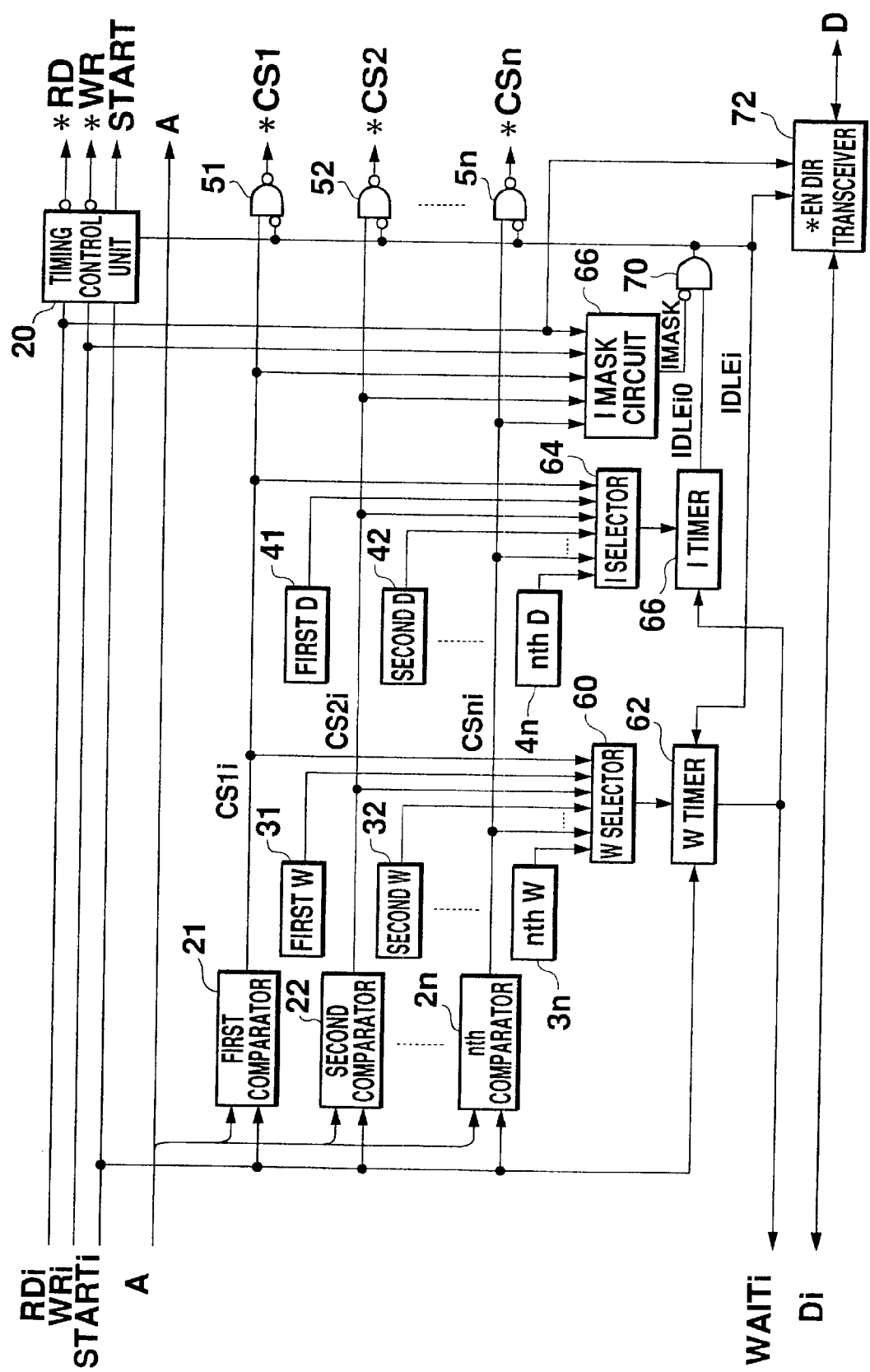
FIG. 2 is a diagram showing an internal configuration of a bus controlling unit of the embodiment.

FIG. 2 shows an internal configuration of the bus controlling unit 4. In FIG. 2, RDi, WRi, and STARTi are input into a timing control unit 20. An idle signal IDLEi which will be described later is also input into the timing control unit 20. When this signal is negated, *RD, *WR, and START are asserted by the devices outside the microcomputer 1.

First, second, and nth comparators 21, 22, and 2n take the address A in, and respectively compare this address to exclusive addresses 1xxxh, 2xxxh, and nxxxh for the first, second and the nth devices 6, 8, and 10. When they coincide with each other, coincidence signals CS1i, CS2i, and CSni are asserted, and input into a positive logic input terminal of NAND gates 51, 52, and Sn.

First, second, nth wait registers 31, 32, and 3n (respectively expressed as "first W", "second W", and "nth W" in FIG. 2) store wait numbers to be inserted upon access to the first, second, and nth devices 6, 8, and 10. The wait numbers are set by data writing to these registers. A wait selector 60 (expressed as "W selector" in FIG. 2) is supplied with the coincidence signals and outputs from the first, second, and nth wait registers 31, 32, and 3n. For example, if CS1i is asserted, the wait number corresponding to the device, that is, an output from the first wait register 31 is selected and output to a wait timer 62 (expressed as "W timer" in FIG. 2). The wait timer 62 keeps asserting the wait signal WAITi over the number of clock periods corresponding to the input wait number, and suspends cycle advancement in the processor 2. To keep the processor 2 from advancing to the next bus cycle while an idle state is being inserted, the wait timer 62 keeps asserting WAITi while the idle signal IDLEi which will be described later is being asserted.

On the other hand, first, second, and nth output disable time registers 41, 42, and 4n (expressed as "first D", "second D" and "nth D" in FIG. 2) store parameters regarding the output disable time of the first, second, and nth devices 6, 8, and 10. These parameters can be set using software. When a maximum output disable time $T_{dmax}$ is adopted as the parameter, $T_{dmax}$ (ns) can be specified in 4 ways as follows, if the output disable time registers respectively have 2 bits:

when $T_{dmax}$ can be regarded as $T_{dmax}=0$ . . . "00" (default)

when $10<T_{dmax}<29$ ns . . . "01"

when $30<T_{dmax}<49$ ns . . . "10"

when $50<T_{dmax}$. . . . "11 ".

An idle selector 64 (expressed as "I selector" in FIG. 2) is supplied with the coincidence signals and outputs from the first, second, and nth output disable time registers 41, 42, and 4n (hereafter, also called $T_{dmax}$ codes). For example, when CS1i is being asserted, output from the first output disable time register 41 is selected and output to an idle timer 66 (expressed as "I timer" in FIG. 2). Based on the $T_{dmax}$ code, the idle timer 66 first calculates the number of clock periods which can cover the output disable time. If the bus clock frequency is 20 MHz, 1 idle state is equivalent to 50 ns. Therefore, the number of clock periods is calculated as follows, based on 4 $T_{dmax}$ codes described above:

If the $T_{dmax}$ code is "00", then 0 clock period.

If the $T_{dmax}$ code is "01" or "10", then 1 clock period.

If the $T_{dmax}$ code is "11", then 2 clock periods.

If the maximum output disable time exceeds 50 ns, in other words, if the $T_{dmax}$ code is "11", the exact number of clock periods is not known. However, 100 ns is generally sufficient, and the number of clock periods is fixed to 2 here.

The idle timer 66 then keeps asserting a signal IDLEi0 over this number of clock periods. To make assertion activation of IDLEi0 standby until the current bus cycle ends, the idle timer 66 refers to WAITi, and keeps itself from advancing while WAITi is being asserted. IDLEiO is input to a positive logic input terminal of an AND gate 70.

An idle mask circuit 68 (expressed a s "I mask circuit" in FIG. 2) takes in RDi, WRi, CS1i, CS2i, and CS2ni. The I mask circuit detects a state in which one and the same device consecutively drives the data bus for two bus cycles, and asserts an IMASK signal. This is because when one and the same device uses a data bus, data conflict can not exist in that case. Concrete assertion conditions of the IMASK signal are as follows:

when WRi is consecutively asserted in two bus cycles.

when RDi is consecutively asserted in two bus cycles, and the corresponding coincide signals CS1i or the like are the same in the two bus cycles.

The former corresponds to the case where the processor 2 consecutively drives the data bus, while the latter is the case where the same external device consecutively drives the data bus. The IMASK signal is input into a negative logic terminal of the AND gate 70, while an idle signal IDLEi which is an output from the AND gate 70 is input into negative logic terminals of NAND gates 51, 52, and 5n as well as into the timing control unit 20.

A transceiver 72 connects buses data Di and data D. The IDLEi signal is input into an enable terminal *EN of the transceiver 72. As long as IDLEi is being negated, the transceiver 72 is in an enable state. The RDi signal is input into an data direction DIR, and as long as RDi is being asserted, data is directed from the outside to the inside, in other words, data D is output to data Di.

[2] Operation

Figure 3:
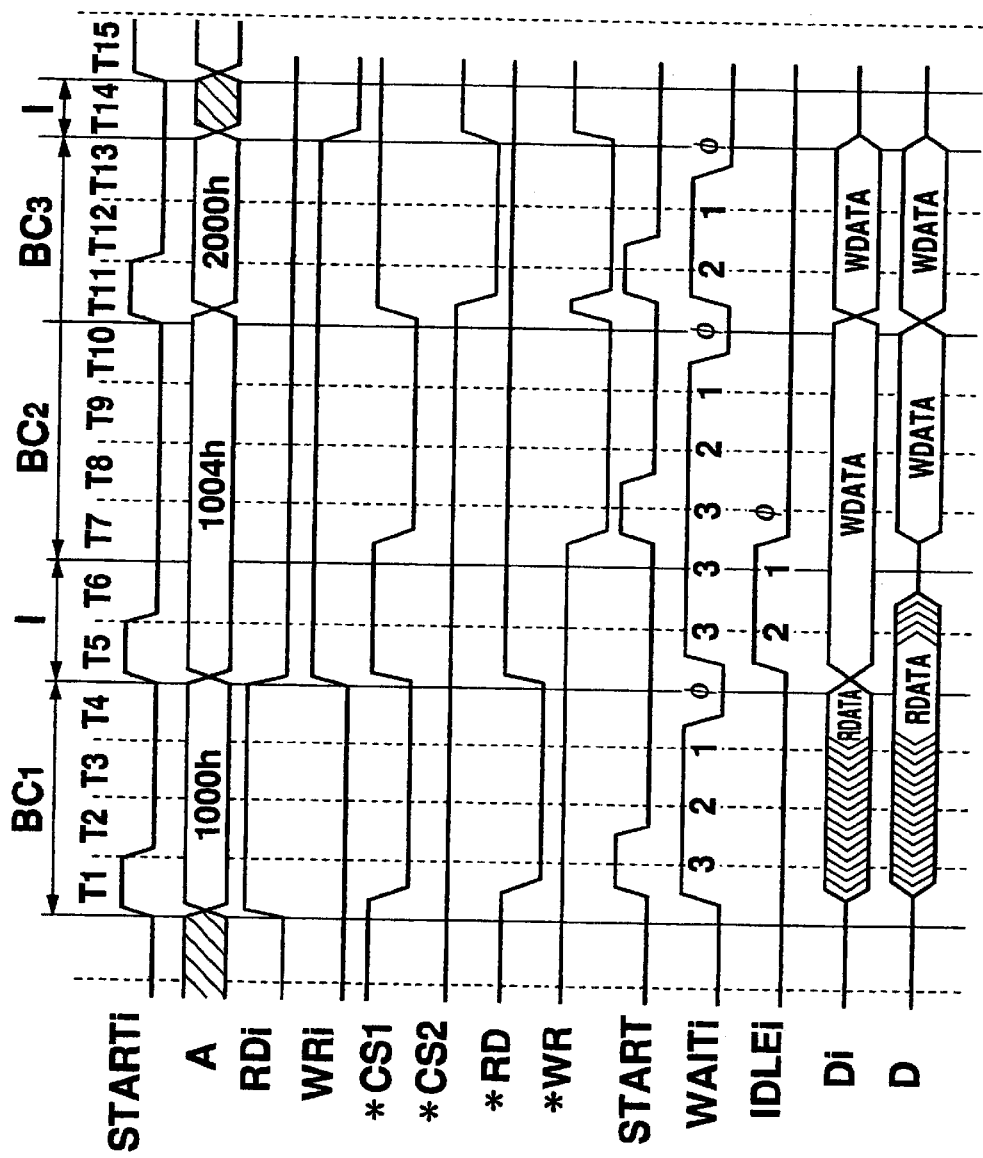
FIG. 3 shows a timing chart example when an external device is accessed by the microcomputer of the embodiment.
Figure 4:
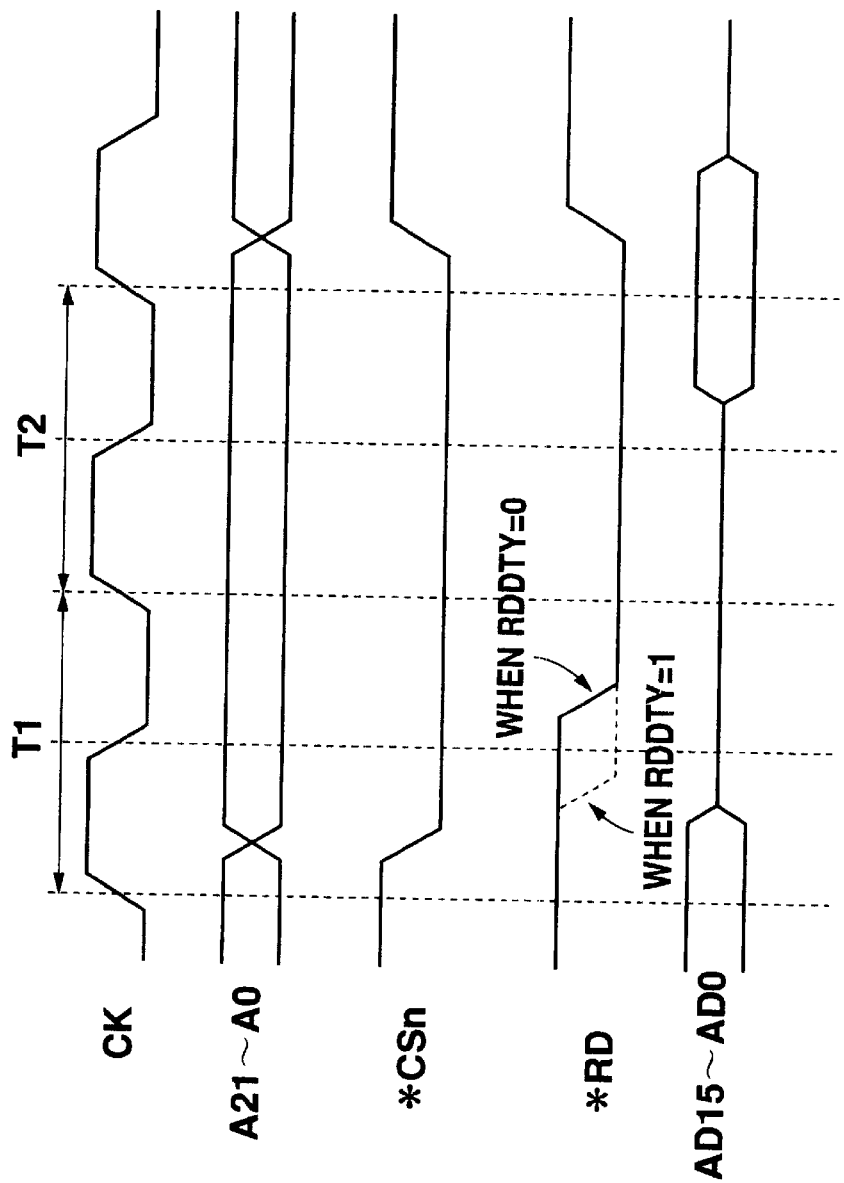
FIG. 4 is a timing chart of a bus cycle described on page 125 of "Hitachi single chip RISC microcomputers SH7032, SH7034, HD6417032, HD6477034, and HD6437034 hardware manual (third edition)".

FIG. 3 is a timing chart when an external device is accessed by the microcomputer 1. Numbers T1 through T15 are to show the clock period which serves as a reference of a bus operation. In FIG. 3, the following 3 bus cycles are depicted:

$BC_1$ . . . data read (1000h) from the first device 6.

$BC_2$ . . . data write (1004h) to the first device 6.

$BC_3$ . . . data write (2000h) to the second device 8.

Regarding the first device 6, the number of the idle states is "2", while the number of wait states is "3". For the second device 8, the number of wait states is "2".

(1) $BC_1$

The processor 2 activates the first bus cycle $BC_1$ at the beginning of T1. STARTi is asserted at the beginning of T1, and START is asserted by the external device via the timing control unit 20. "1000h" appears on the address A, and *CS1 is asserted, since CS1i is asserted by the first comparator 21. *RD is also asserted in response to the assertion of RDi. The first device 6 starts driving the data D in the middle of the period T1 when *RD and *CS1 are both asserted. However, since an access time is long, an efficient read data RDATA appears in T4 on the bus. Since IDLEi is not asserted in $BC_1$, the transceiver 72 is in the enable state, and the data D appears on the data Di while *RD is being asserted.

Following the assertion of CS1i, the number of wait cycles "3" having been stored in the first wait register 31 is selected by the wait selector 60 and sent to the wait timer 62. WAITi is kept asserted by the wait timer 62 over 3 clock periods, and the count of wait is decreased by 1 at the end of each clock period. $BC_1$ ends at the end of the period T4 when the number of wait cycles becomes 0. However, since the output disable time of the first device 6 is long, output of the read data on data D continues until near T6.

As for the idle state, following the assertion of CS1i, the number of idle states "2" having been stored in the first output disable register 41 is selected by the idle selector 64 and sent to the idle timer 66. The idle timer 66 keeps asserting IDLEi for 2 clock periods following the clock period in which WAITi is negated.

(2) $BC_2$

The processor 2 confirms that WAITi is negated at the end of T4, and starts the next bus cycle $BC_2$ by asserting STARTi at T5. However, since IDLEi is being asserted at this time, an idle state is inserted for the external bus. The idle state I corresponds to T5 and T6. During these periods, the transceiver 72 is also disabled, and the data D and data Di are separated. As a result, a conflict is avoided between write data WDATA from the processor 2 appearing on the data Di and the read data RDATA from the first device 6 still remaining on the data D.

While IDLEi is being asserted, assertion of *WR and START is kept on standby in the timing control unit 20, and assertion of *CS1 is kept on standby at the NAND gate 51. These signals are asserted by the external devices in T7 when IDLEi is negated. While IDLEi is being asserted, count-down of the wait timer 62 is also suspended, and WAITi is kept asserted. The wait timer 62 starts the count-down after IDLEi is negated, and keeps asserting WAITi over 3 clock periods. The cycle ends in T10. Therefore, the processor 2 itself activates the bus cycle in T5, while the bus cycle is activated in T7 when viewed from the outside of the microcomputer. The number of wait cycles is 3 for the bus cycle, while the number of wait cycles for the processor is 5.

(3) $BC_3$

Since WRi is consecutively asserted in $BC_2$ and $BC_3$, the idle mask circuit 68 asserts IMASK signal. As a result, IDLEi which is an output from the AND gate 70 is negated, and BC3 becomes an ordinary bus cycle before which no idle state was inserted. $BC_3$ ends in T13 according to the number of waist "2" having been set in the second wait register 32. T14 is a natural idle state which occurs when no following bus cycle is requested within the processor 2.

According to the embodiment described above, data conflicts can be avoided without unnecessary degradation of performance, since an idle state is only inserted when necessary. A designer of an external circuit will no longer be hampered by design regarding the output disable time.

[3] Modifications

Regarding the present embodiment, modifications such as those shown below are possible.

(1) The processor 2 and the bus controlling unit 4 are meant to be installed in the single microcomputer 1 here. However, they can of course be separated in different configurations. In that case, the present invention can be applied as an external circuit of a known microprocessor.

(2) $T_{dmax}$, which is the maximum output disable time, is considered as the parameter stored in the first output disable time register 41 or the like. However, a desired number of idle states itself may be used as the parameter. In that case, since the register has 2 bits, an idle state number of 0 to 3 can be specified, for example.

(3) The idle state number may be estimated using the wait number. Since a low speed device with a larger number of wait cycles generally has longer output disable time, it is possible to allow the idle state to be 1 when the wait number exceeds 4, and 2 when the wait number exceeds 10, for example. In that case, the circuit for the first output disable time register 41 or the like is not necessary, and it will be sufficient to have a table or the like to store a relationship between the output from the first wait register 31 or the like and the idle state number to be inserted.

(4) In the present embodiment, output disable time has been explained. It is of course possible, however, to delay a following bus cycle start depending on a device characteristic other than the output disable time. For example, if one device is read once and a recovery time is necessary before the next read, a recovery time may be set instead of the output disable time of the present embodiment.

While there has been described what is at present considered to be a preferred embodiment of the invention, it will be understood that various modifications can be made thereto, and it is intended that the appended claims cover all such modifications as fall within the true spirit and scope of the invention.

What is claimed is:

1. A bus cycle controlling method which, when write or read access is made following a previous access of a first device in a current bus cycle in a successive access operation for a second device, considers an output disable time of the first device being accessed in the current bus cycle, to delay activation of a following bus cycle for the following write or read access, when such delay is necessary to avoid data conflicts between data of the previous access and read or write data of the following read or write access caused by a long output disable time, the delay in activating the following bus cycle being accomplished by inserting a preset number of necessary idle state according to the output disable time of said first device, and to prohibit insertion of said number of necessary idle state when no data conflict occurs, wherein the bus cycle controlling method does not insert an idle state during successive accesses when the first and second devices are the same single device.

2. The bus cycle controlling method according to claim 1, wherein when each device is allocated in an exclusive address space, the number of necessary idle state is previously set for each exclusive address space in accordance with the output disable time of each device, said number of necessary idle state is inserted before the bus cycle following said current bus cycle based on an address being used for access to said first device in the current bus cycle.

3. The bus cycle controlling method according to claim 1, wherein when each device is accessed according to the characteristics of the device, the number of necessary idle state is previously set for each bus wait cycle in accordance with the output disable time of each device, so that said number of necessary idle state is inserted before the bus cycle following said current bus cycle based on a number of wait cycles in the current bus cycle.

4. The bus cycle controlling method according to claim 1 where the first device and the second device are attached to one bus.

5. A bus controlling equipment, comprising:

a setting unit for setting a number of necessary idle state of a device to be accessed; and a controlling unit for inserting the number of necessary idle state after a current bus cycle, in response to an output disable time of a first device being accessed in the current bus cycle, wherein controlling unit inserts the number of necessary idle state if the first device accessed in the current bus cycle requires a delay to prevent conflict with access to a second device in a bus cycle following the current bus cycle and does not insert an idle state if the first device accessed in the current bus cycle will not conflict with an access to the second device in the bus cycle following the current bus cycle or if the first and second device are the same single device.

6. The bus controlling equipment according to claim 5 which further comprises:

a judging unit for judging whether or not the first device to output data in the current bus cycle and the second device to output data in the following bus cycle are one and the same, and a prohibition unit for prohibiting insertion of the idle state after the current bus cycle if the devices are judged to be one and the same by the judging unit.

7. The bus controlling equipment according to claim 5 where the first device and the second device are attached to one bus.

* * * * *